United States Patent [19]

Byers et al.

[11] Patent Number: 4,953,167

[45] Date of Patent: Aug. 28, 1990

[54] DATA BUS ENABLE VERIFICATION LOGIC

[75] Inventors: Larry L. Byers, Apple Valley; Wayne A. Michaelson, Circle Pines; Joseba M. Desubijana, Minneapolis, all of Minn.

[73] Assignee: Unisys Corporation, Blue Bell, Pa.

[21] Appl. No.: 244,190

[22] Filed: Sep. 13, 1988

[51] Int. Cl.$^5$ ............................................. G06F 11/00
[52] U.S. Cl. .................................. 371/29.5; 371/16.5; 371/57.1
[58] Field of Search ....................... 371/25.1, 57.1, 60, 371/16.5, 29.1, 29.5

[56] References Cited

U.S. PATENT DOCUMENTS

| | | | |
|---|---|---|---|
| 3,164,727 | 1/1965 | Heyda | 371/52 |
| 3,539,786 | 11/1970 | Raehpour | 371/57.1 |
| 3,614,735 | 10/1971 | Mauger et al. | 371/52 |
| 3,812,337 | 5/1974 | Crosley | 371/57.1 |
| 4,020,293 | 4/1977 | Ashley | 371/57.1 |

*Primary Examiner*—Charles E. Atkinson
*Attorney, Agent, or Firm*—John B. Sowell; Glenn W. Bowen; Robert S. Bramson

[57] ABSTRACT

Logic checking circuits are provided for verifying whether or not the data bus enable logic circuits are operating properly in response to operational commands to transmit or to NOT transmit data. The transmit latches in the bus interface logic circuits are continuously monitored to determine if they are set or NOT set in a position to enable transmission of data or NOT to enable transmission of data to a bus. Transmit gating circuit means are couple to the output of said transmit latches for determining if all of the transmit latches are in the same state and are in the state ordered by the central controller, and for determining whether the state ordered by the central controller occurs in the exact time period during which the command to transmit should be executed.

7 Claims, 3 Drawing Sheets

DATA BUS ENABLE VERIFICATION LOGIC

BACKGROUND OF THE INVENTION

1. Field of the Invention

The present invention is related to logical checking circuits for continuously monitoring the flow of data being transmitted from cards (boards or elements) of a main storage unit (MSU) or central processing unit (CPU). More particularly, the present invention is related to circuits for checking whether bus interface logic circuits on a card are properly transmitting or NOT transmitting data to a bus at the time designated by the central pipeline controller for transmitting data.

2. Description of the Prior Art

Computers and main storage units which employ bus architecture have a plurality of cards connected between the read bus and the write bus. Information originating at one card must be placed on a read or write bus before being available as input data to another card or an outside peripheral equipment. For example, data originating at a memory card is READ onto a read bus and routed to any of the other cards including a Port card which connects to other parts of the computer or to peripheral equipment.

High-speed main frame computers issue commands to transmit data to predetermined address locations of memory or logic cards at timed intervals less than 50 microseconds (u sec). If any of the many gates and latches malfunction during the designated transmission time, erroneous data may be placed on the bus. The wrong data may be transmitted at the right time or the wrong time and correct data may be transmitted at the wrong time. Such conditions would not be immediately detected by parity checking circuits which are designed to detect one bit errors in the data being transmitted.

Accordingly, it would be highly desirable to provide logical checking circuits which monitor cards or elements of a CPU or MSU to determine if the card designated to transmit data is the only card which is made capable of transmitting data during the time period allowed for the transmission of the data from the designated card.

SUMMARY OF THE INVENTION

It is a primary object of the present invention to provide logical checking circuits associated with the bus interface logic on a card for monitoring the transmit status of every card simultaneously.

It is a primary object of the present invention to provide a plurality of fault indicating circuits which monitor the status of the transmit logic circuits of every card CPU of MSU to be checked.

It is another object of the present invention to provide a plurality of fault indicating circuits which detect the presence or absence of proper transmit conditions on all cards to be monitored.

It is another object of the present invention to provide a plurality of fault indicating circuits which detect if the logic circuits in the bus interface gate arrays (BIGAS) have been properly set in response to transmit signals during a designated time interval.

It is a general object of the present invention to provide a plurality of logical checking circuits for continuously monitoring the status of all bus interface logic circuits associated with the transmit operation.

According to these and other objects of the present invention, there is provided a first logic checking circuit to monitor whether the transmit latches in the bus interface logic circuits have been properly activated and a second logic checking circuit to monitor whether the transmit latches are properly deactivated at the end of the designated transmission period. A third logic checking circuit is provided to monitor whether the other bus interface logic circuits are deactivated when the designated interface logic circuits are activated.

DESCRIPTION OF THE PREFERRED EMBODIMENT

Figure 1:
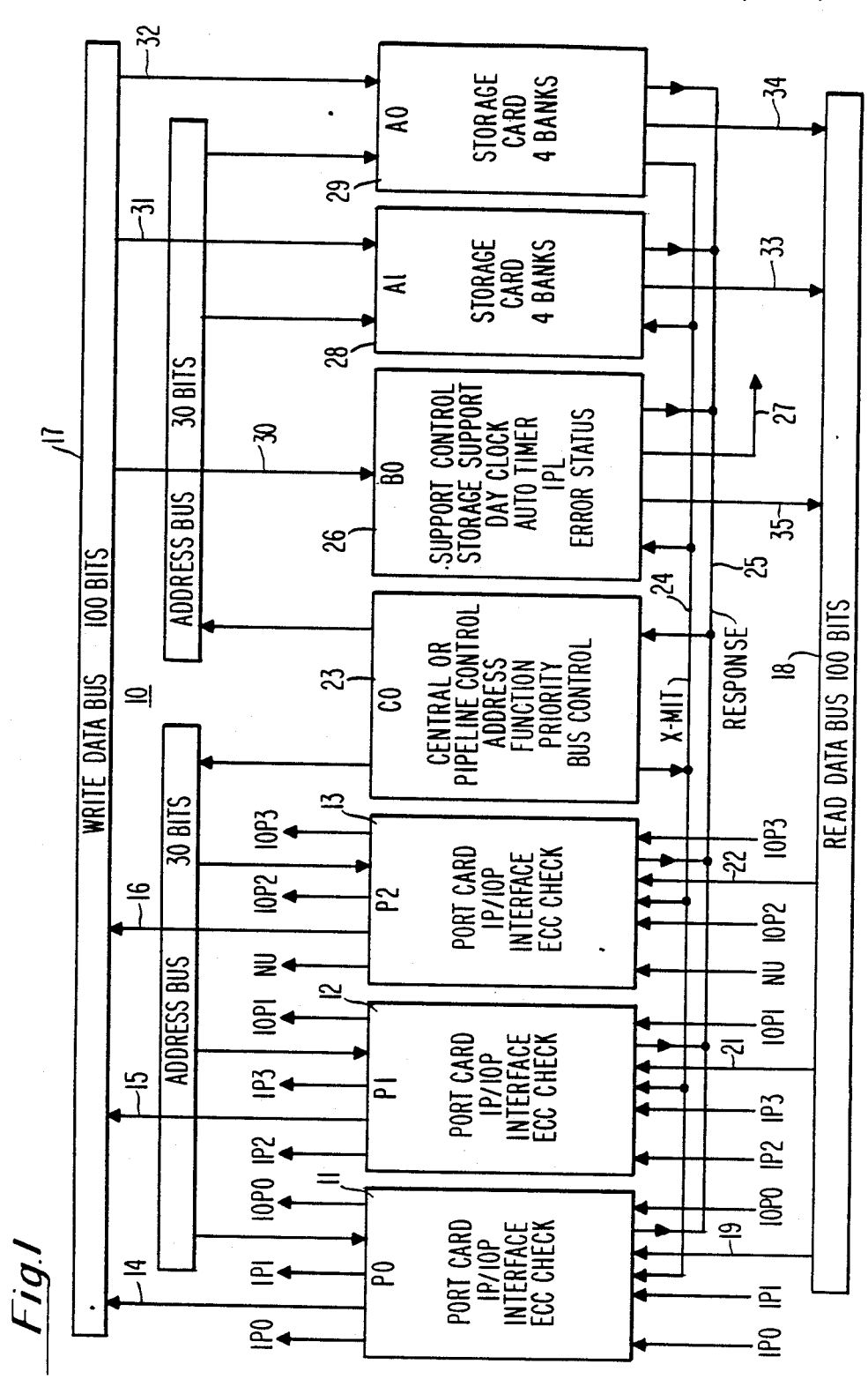
FIG. 1 is a basic block diagram of a preferred embodiment main storage unit in which the present invention is utilized.

Refer now to FIG. 1 showing a block diagram of a main storage unit 10. Main storage unit 10 is provided with three Port cards 11, 12 and 13 which are shown having data input lines from peripheral and outside equipment not shown. These lines are designated as IP and IOP lines. Similarly, the Port cards are provided with output lines which are connected to outside and peripheral equipment designated as IP and IOP lines. Each of the Port cards 11, 12 and 13 is provided with its own write data line 14, 15 and 16 which connects to the write data bus 17. Information from the read data bus 18 connects to the Port cards 11, 12 and 13 through individual read data lines 19, 21 and 22. At each of the lines 14 to 16 and 19 to 22 there is an interface logic chip or interface logic circuit on the Port card as will be explained hereinafter. Information being routed to or from the write bus 17 and read bus 18 is controlled by a central pipeline controller 23 which controls the flow of information to and from the Port cards by control lines not shown. For purposes of explaining the present invention, the control lines which generate the transmit signal are shown as lines 24 and control lines which receive the response from the cards transmitting data are designated response lines 25. Support control card 26 performs numerous functions, one of which is to collect the error status data (which will be explained hereinafter) and to transmit this information in a proper format via line 27 to a maintenance controller (not shown). It will be understood that the maintenance controller interprets the information and is capable of storing the information for maintenance use and or shutting down the MSU or CPU (or portions thereof) which have been found to be producing errors. Storage cards 28 and 29 are provided with write data input lines 31 and 32 connected to the write bus 17 and further provided with read data lines 33 and 34 connected to the read data bus 18. The support controller 26 is provided with a write data line 30 and a read data line 35. Information transmitted from Port cards 11, 12 and 13 on lines 14, 15 and 16 passes through a transmit bus interface gate array. Information being transmitted from cards 26, 28 and 29 passes through transmit bus interface gate arrays and onto lines 35, 33 and 34. The transmit bus interface gate arrays are monitored by the preferred embodiment control circuitry to be explained hereinafter.

Figure 2:
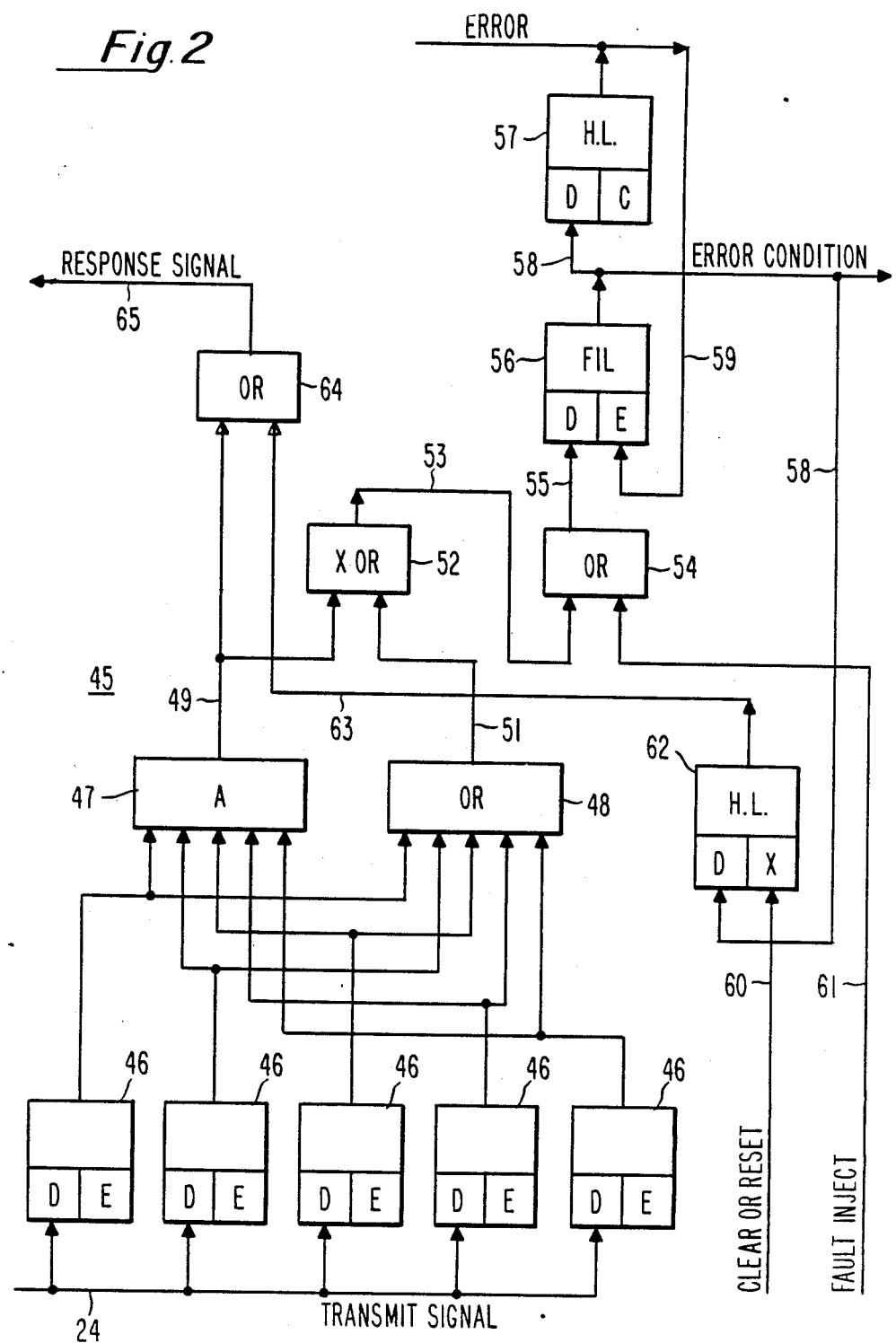
FIG. 2 is a detailed block diagram of a first error checking circuit which is implemented in each of the bus interface gate arrays.

Refer now to FIG. 2 showing a detailed block diagram of a first error checking circuit, the type of which is associated with each of the transmit bus interface gate arrays on the cards 11, 12, 13, 26, 28 and 29 at their output data lines. In the preferred embodiment to be explained hereinafter, two transmit bus interface gate arrays (BIGAS) are used on each card for purposes of accessing two words of five bytes simultaneously. The error checking circuit 45 of FIG. 2 is associated with one of the two data words and it will be understood that another identical first error checking circuit 45 is required for each card to check the two words being accessed on the storage cards 28 and 29.

A transmit signal on line 24 is issued as a command or operation by controller 23 and enters the data side of the five transmit latches 46, each of which is associated with a byte of a data word. The transmit signal on line 24 is only transmitted to the unique data card from which data words are being accessed and is implemented by setting the five transmit latches 46 for each data word being accessed. The output of the five latches 46 is applied to the input of AND gate 47 and OR gate 48 to produce output signals on lines 49 and 51 respectively. The outputs of gates 47 and 48 on lines 49 and 51 are applied to the input of exclusive OR gate 52 to produce an output on line 53. The output on line 53 is indicative of whether all five transmit latches 46 are in the same state or not. When the state of any one transmit latch 46 is different from the state of the other transmit latches, this indicates an error condition has occurred because the latches are all active to transmit data or inactive when other cards are transmitting data. The error signal on line 53 is applied to an OR gate 54 to produce an output on line 55 to the data input of fault indicating latch 56 which is set if an error condition occurs. The output of latch 56 is applied to the data input of hold latch 57 via line 58 to produce a hold signal on line 59 which is returned to the enable input of fault indicating latch 56 to hold the latch in an error condition and to hold the error condition on line 58 which is connected to the fault capture logic on this same card. The fault capture logic collects the error conditions on the support control card 26 as explained hereinbefore. A maintenance logic line 61 is shown connected to OR gate 58 for injecting a fault logic signal during maintenance procedures to test the error reporting circuitry.

The error signal held on line 58 is also applied to the data side of a second hold latch 62 to produce an output signal on line 63 during the time period when the error condition is occurring. The signals on line 63 and line 49 from the output of AND gate 47 are applied to OR gate 64 to produce a bi-level response signal on output line 65. If the transmit signal on line 24 correctly activates all latches 46, there is a response signal on line 49 and line 65 indicative of a proper transmit condition at the time designated for transmitting data. However, if any of the latches or circuitry shown in FIG. 2 fail during this predetermined transmit time, an error will be generated on line 63 and also on response signal line 65 indicating that an error has occurred. It will be noted that the hold latch 62 continues to hold the error signal on response signal line 65 until cleared by a clear or reset signal on line 60 that only occurs after proper surveillance and maintenance procedures are made. The first error checking circuit 45 continues to monitor the condition of latches 46 and its associated gating circuitry even when the latches are not activated by the controller 23 in an attempt to transmit data. If any of the latches 46 or the associated gating circuitry raises an active signal when in fact the card or element is not ordered to transmit data, an error signal will be produced on line 53 which in turn raises an error signal on output line 63 to OR gate 64 and raises an error response signal on line 65 indicating that a fault or transmit signal is being produced when in fact the controller has not solicited a response signal indicative of a transmit signal.

Figure 3:
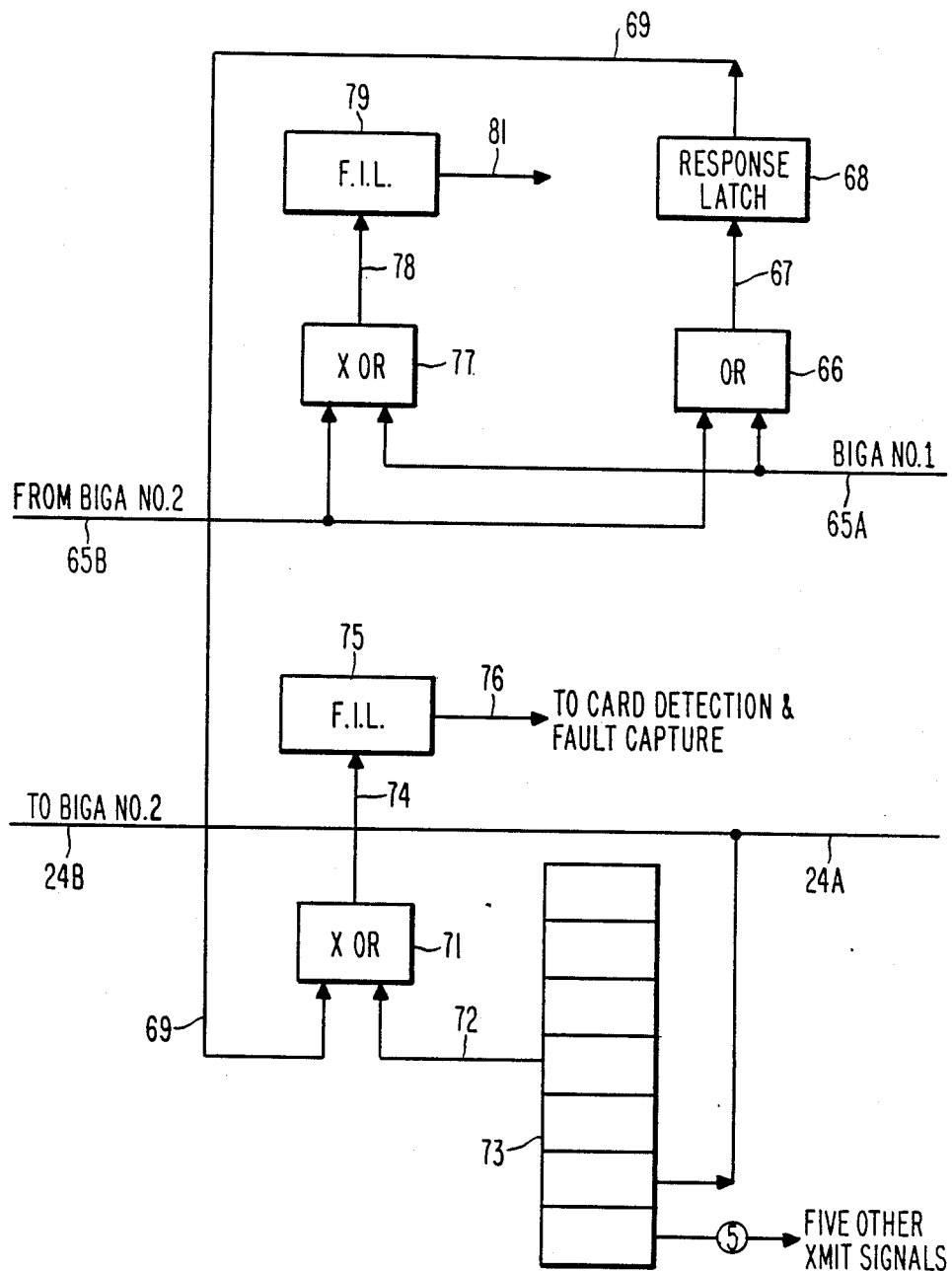
FIG. 3 is a block diagram of a second and a third error checking circuit which is implemented on each card or element of the preferred embodiment MSU (or a CPU) to be monitored.

Refer now to FIG. 3 showing a block diagram of a second and a third error checking circuit which is implemented on each card. Each FIG. 3 circuit accepts input information from two of the circuits of the type shown in FIG. 2 representative of two transmit bus interface gate arrays. Thus, response signal line 65 from FIG. 2 is shown as input line 65A from a first gate array. An input line 65B from a second gate array is applied to the same circuit. Similarly, the transmit signal on line 24 from controller 23 to the first gate array is shown as line 24A and the signal to the second gate array is shown as line 24B. Response signals on lines 65A and 65B are applied to the input of OR gate 66 to produce a combined response signal on line 67 which is set in latch 68. If the response signal set in latch 68 is an error signal it will not change at the end of the transmit period. However, if a proper response latch signal is produced on line 69, it is capable of changing its level at the end of the predetermined transmit time. The signal on line 69 is applied to exclusive OR gate 71 which receives a second input signal on line 72 from the sequence controller 73 which is a part of controller 23. The signal on line 72 indicates the time period during which a proper response signal on line 69 should occur, and if the response signal on line 69 deviates in time or error signal level it produces an error signal on line 74 which may be designated a time slot error signal. The error signal on line 74 sets a second fault indicating latch 75 which produces an error signal on its output line 76 that is routed back to the card containing the detection and fault capture logic circuitry which is eventually routed back to card 26. It will be understood that a sequence time slot line 72 will be provided for each of the cards and a fault indicating latch 75 will be provided for each of the cards to indicate which card has produced a time slot error.

The response signals on lines 65A and 65B from the two transmit bus interface gate arrays on a single card are also applied as inputs to exclusive OR gate 77 to produce an output on line 78 indicative of an error condition in either of the interface gate arrays. The error signal on line 78 is latched into the third fault indicating latch 79 and produces an output signal on line 81 which is routed back to the aforementioned detection and fault capture circuitry as explained hereinbefore.

Having explained the operation of the three fault indicating latches 56, 75 and 79, it will be understood that in the preferred embodiment the novel error correction circuitry shown in FIG. 2 may be implemented on the same gate array which performs the transmit bus interface function. Thus, the response signal being produced on line 65 is a signal produced during real time transmission operations and since these signals are employed to generate the error conditions in the other two error detection circuits shown in FIG. 3, they also are operating in real time during a transmit operation.

When the novel error checking circuitry shown in FIG. 2 is employed with the preferred embodiment main storage unit 10, one FIG. 2 error correction circuit is employed for each data word. Since two data words are being accessed simultaneously, twelve such circuits would be employed for the MSU 10. Since the fault indicating circuits 75 and 79 accept the output response signals from two of the FIG. 2 error detection circuits, only six FIG. 3 error detection circuits with fault indicating latches 75 and 79 are required for the preferred embodiment MSU 10.

What we claim is:

1. Logic checking circuits for monitoring the status of bus interface logic circuits, comprising:
   bus interface logic circuits having a plurality of transmit latches for each data word to be transmitted to a bus,
   a central pipeline controller for issuing a transmit command to each of said latches in said BILC to activate the transmit command,
   said central pipeline controller having timing means for defining transmit and response times,
   transmit gating means coupled to the output of said transmit latches of each data word for determining if all transmit latches of a data word have been activated, and
   transmit fault indicating means coupled to the output of said gating means for indicating a transmit error of the data word which occurs during the transmit time.

2. Logic checking circuits as set forth in claim 1 which further includes response fault indicating means coupled to the output of said transmit gating means and said central pipeline controller for indicating a response error during the response time of a data word being transmitted.

3. Logic checking circuits as set forth in claim 1 which further includes second fault indicating means coupled to the output signals from a plurality of said transmit gating means for indicating if the plural output signals are congruent.

4. Logic checking circuits as set forth in claim 2 wherein said response fault indicating means further includes sequence control means in said central pipeline controller for generating a signal which defines a time slot window during which said transmit gating means are activated to transmit a data word.

5. Logic checking circuits as set forth in claim 4 wherein said response fault indicating means further includes a fault indicating latch for holding an error signal.

6. Logic checking circuits as set forth in claim 5 wherein said fault indicating latch may be set during NOT transmit time or during transmit time indicated by said time slot window.

7. Logic gating circuits as set forth in claim 1 wherein said transmit gating means includes an AND and an OR gate, each said gate being coupled to receive an input from the output of all said plurality of transmit latches and having outputs coupled to the input of an exclusive OR gate for generating a signal indicative of the fact that all of said plurality of said transmit latches are NOT in the same state at the same time.

* * * * *